United States Patent [19]

Critchfield et al.

[11] Patent Number: 5,861,051
[45] Date of Patent: *Jan. 19, 1999

[54] PROCESS FOR REMOVING CARBON DIOXIDE FROM GAS MIXTURE

[75] Inventors: James E. Critchfield; Wei-Yang Su, both of Austin; Thomas J. Kenney, Houston; Patrick E. Holub, Spring, all of Tex.

[73] Assignee: Huntsman Petrochemical Corporation, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 720,587

[22] Filed: Sep. 30, 1996

Related U.S. Application Data

[60] Provisional application No. 60/

[51] Int. Cl.⁶ .................................................. B01D 47/06
[52] U.S. Cl. ................................ 95/172; 95/177; 95/192; 95/235; 95/236
[58] Field of Search ........................... 95/181, 183, 235, 95/236, 177, 172, 192; 55/220, 228

[56] References Cited

U.S. PATENT DOCUMENTS

| | | | |
|---|---|---|---|
| 2,712,978 | 7/1955 | Blohm et al. | 23/2 |
| 3,502,428 | 3/1970 | Gelbein et al. | 95/236 |
| 3,622,267 | 11/1971 | Bartholome et al. | 23/2 R |
| 3,891,742 | 6/1975 | Yeakey et al. | 423/229 |
| 4,100,257 | 7/1978 | Sartori et al. | 95/235 |
| 4,101,633 | 7/1978 | Sartori et al. | 423/228 |
| 4,330,305 | 5/1982 | Kuesner et al. | 95/236 |
| 4,336,233 | 6/1982 | Appl et al. | 423/228 |
| 4,372,873 | 2/1983 | Nieh | 252/389 R |
| 4,405,582 | 9/1983 | Stogryn et al. | 423/228 |
| 4,483,833 | 11/1984 | Stogryn et al. | 423/228 |
| 4,483,834 | 11/1984 | Wood | 95/236 |
| 4,508,692 | 4/1985 | Savage et al. | 423/228 |

(List continued on next page.)

FOREIGN PATENT DOCUMENTS

| | | | |
|---|---|---|---|
| 160203 | 7/1984 | European Pat. Off. | |
| 160203 | 11/1985 | European Pat. Off. | 95/236 |
| 558019 | 9/1993 | European Pat. Off. | 95/236 |
| 3236600 | 4/1984 | Germany | 95/236 |
| 3411532 | 10/1985 | Germany | 95/183 |
| 3427134 | 2/1986 | Germany | 95/236 |
| 3922904 | 1/1991 | Germany | 95/235 |
| 1611411 | 12/1990 | U.S.S.R. | 95/236 |
| 2191419 | 12/1987 | United Kingdom | 95/235 |

OTHER PUBLICATIONS

Kohl and Riesenfeld, "Gas Purification," In: *Gas Purification, Fourth Edition*, Texas:Gulf Publishing Company, pp. 48–49, 843–845, 1960.

Meissner and Wagner,"Low–Energy Process Recovers $CO_2$," *Oil & Gas Journal*, 55–58, Feb. 1983.

Zawacki et al., "Process Optimized for High Pressur Gas Cleanup," *Hydrocarbon Processing*, pp. 143–149, Apr. 1981.

*Primary Examiner*—Duane S. Smith
*Attorney, Agent, or Firm*—Arnold, White & Durkee

[57] ABSTRACT

This invention relates to a process for the separation of carbon dioxide and hydrogen sulfide from gases using a promoted methyldiethanolamine (MDEA) solution. In one broad respect, this invention is a gas separation process, including contacting an aqueous treating solution with a sour gas stream that contains carbon dioxide and hydrogen sulfide under conditions such that the gas stream is sweetened, wherein the aqueous treating solution contains methyldiethanol amine and 2-(2-aminoethoxy)ethanol in a ratio of at least about 2:1; and wherein the process is conducted in the absence of a reclamation step. By practice of this invention, the amount of 2-(2-aminoethoxy)ethanol that is converted to urea(bis-(2-hydroxyethoxyethyl)urea (BHEEU)) is minimized which obviates the need for a reclamation (regeneration) unit.

21 Claims, 1 Drawing Sheet

U.S. PATENT DOCUMENTS

| | | | |
|---|---|---|---|
| 4,537,753 | 8/1985 | Wagner et al. | 423/228 |
| 4,551,158 | 11/1985 | Wagner et al. | 95/236 |
| 4,618,481 | 10/1986 | Heinzelmann et al. | 95/235 |
| 4,665,234 | 5/1987 | Stogryn | 564/483 |
| 4,696,803 | 9/1987 | Nieh | 95/235 |
| 4,710,211 | 12/1987 | Gazzi et al. | 95/235 |
| 4,741,884 | 5/1988 | Carter et al. | 95/235 |
| 4,857,283 | 8/1989 | Madden, II | 423/228 |
| 4,944,917 | 7/1990 | Madden, II et al. | 422/13 |
| 4,997,630 | 3/1991 | Wagner et al. | 423/228 |
| 4,999,031 | 3/1991 | Gerhardt et al. | 95/236 |
| 5,061,465 | 10/1991 | Carter | 423/229 |
| 5,209,914 | 5/1993 | Peytavy et al. | 423/228 |
| 5,246,619 | 9/1993 | Niswander | 252/183.11 |
| 5,292,493 | 3/1994 | Audeh et al. | 423/229 |
| 5,348,714 | 9/1994 | Peytavy et al. | 423/228 |
| 5,378,442 | 1/1995 | Fujii et al. | 423/228 |

PROCESS FOR REMOVING CARBON DIOXIDE FROM GAS MIXTURE

This application is a continuation of provisional patent application Serial No. 60/011,602, filed Mar. 6, 1996, entitled "Process for Removing Carbon Dioxide From Gas Mixture," by James E. Critchfield, Wei-Yang Su, Thomas J. Kenney, and Patrick E. Holub, now abandoned.

BACKGROUND OF INVENTION

The present invention relates to a process for the separation of carbon dioxide and hydrogen sulfide from gases using a promoted methyldiethanolamine (MDEA) solution.

The scrubbing of sour gases, i.e. gases containing carbon dioxide and/or hydrogen sulfide, is widely practiced in the oil and gas industry. One family of scrubbing liquids includes aqueous compositions that contain amines. For instance, it is common to employ scrubbing liquids containing tertiary amines, such as methyldiethanolamine (MDEA).

For a variety of reasons, scrubbing liquids containing MDEA have had primary amines, such as monoethanol amine (MEA), added thereto. It is perceived that addition of certain amounts of MEA enhances the scrubbing capacity of MDEA liquids, without seriously undermining the advantages of the MDEA (e.g., facile deabsorption of sour gas).

Another primary amine which has been discussed previously for use in conjunction with MDEA is 2-(2-aminoethoxy)ethanol. 2-(2-aminoethoxy)ethanol is available commercially at the present time from Huntsman Corporation under the trademarks DIGLYCOL AMINE® and DGA®.

However, it is also known that DIGLYCOL AMINE® brand 2-(2-aminoethoxy)ethanol, when used alone in aqueous or non-aqueous scrubbing liquids, degrades to form bis-(2-hydroxyethoxyethyl)urea (BHEEU). BHEEU is ineffective in removing the acid gas impurities from the sour gas. Thus, DIGLYCOL AMINE® brand 2-(2-aminoethoxy) ethanol must be replaced or regenerated periodically to retain efficiency. Regeneration is commonly performed in a reclamation unit, in which the urea is heated. Such reclamation units are costly and thereby add a disincentive to end users from employing scrubbing solutions based on DIGLYCOL AMINE® brand 2-(2-aminoethoxy)ethanol.

In view of this background, the industry has been adverse to using DIGLYCOL AMINE® brand 2-(2-aminoethoxy) ethanol as an alternative primary amine, as opposed to MEA, in conjunction with MDEA. That is, due to the known degradation of DIGLYCOL AMINE® brand 2-(2-aminoethoxy)ethanol, the industry has been led away from employing MDEA and DIGLYCOL AMINE® brand 2-(2-aminoethoxy)ethanol.

It can thus be seen that a need exists for a DIGLYCOL AMINE® brand 2-(2-aminoethoxy)ethanol promoted MDEA scrubbing liquid which overcomes the problems identified above. It would be advantageous to possess a DIGLYCOL AMINE® brand 2-(2-aminoethoxy)ethanol promoted MDEA liquid that does not require regeneration by way of a reclamation unit, for instance.

SUMMARY OF INVENTION

We have found that with 2-(2-aminoethoxy)ethanol promoted MDEA solution, carbon dioxide can be removed efficiently, and no solvent regeneration is needed. This promoted MDEA solution contains about from 25% to 50% by weight of MDEA and from about 3% to about 15% of 2-(2-aminoethoxy)ethanol, more specifically by using ratio (wt/wt) of MDEA to DIGLYCOL AMINE® brand 2-(2-aminoethoxy)ethanol of at least about 2:1.

In one broad respect, this invention is a process for the separation of carbon dioxide and hydrogen sulfide from a gas stream, said process comprising contacting a treating solution with the gas stream, said treating solution comprising from about 25% to about 50% by weight of MDEA and from about 3% to about 15% of 2-(2-aminoethoxy)ethanol.

In another broad respect, this invention is a gas separation process, comprising contacting an aqueous treating solution with a sour gas stream that contains carbon dioxide and hydrogen sulfide under conditions such that the gas stream is sweetened, wherein the aqueous treating solution contains methyldiethanol amine and 2-(2-aminoethoxy)ethanol in a ratio of at least about 2:1; and wherein the process is conducted in the absence of a reclamation step.

In yet another broad respect, this invention is a gas purification process, consisting of contacting a sour gas stream with an aqueous treating composition under conditions such that the sour gas is sweetened, wherein the aqueous treating composition contains methyldiethanolamine and DIGLYCOL AMINE® brand 2-(2-aminoethoxy) ethanol is at least about 2:1.

By the practice of this invention, the need for a reclamation step using an MDEA/DIGLYCOL AMINE® brand 2-(2-aminoethoxy)ethanol liquid is eliminated. This provides a process requiring less steps, and reduce manufacturing costs, from that previously thought necessary for DIGLYCOL AMINE® brand 2-(2-aminoethoxy)ethanol absorption liquids.

DETAILED DESCRIPTION OF THE INVENTION

Figure 1:
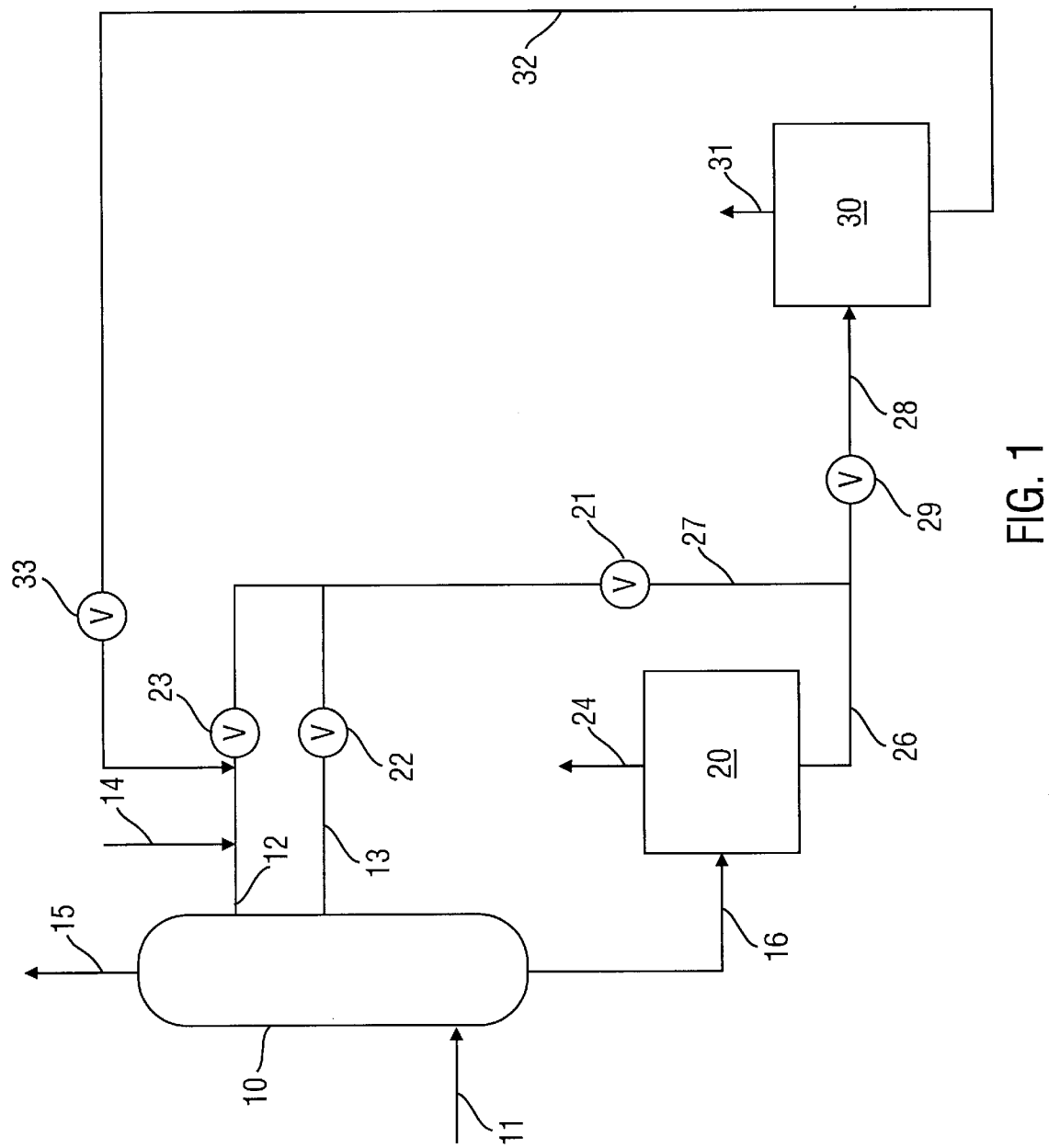
FIG. 1 shows an absorption process of the present invention.

The following U.S. Patents are hereby expressly incorporated by reference: U.S. Pat. No. 2,712,978, U.S. Pat. No. 3,891,742, U.S. Pat. No. 3,622,267, U.S. Pat. No. 4,336,233, U.S. Pat. No. 4,537,753, U.S. Pat. No. 4,997,630, U.S. Pat. No. 5,246,619, and U.S. Pat. No. 5,209,914. These patents describe a variety of scrubbing processes in which the MDEA/DIGLYCOL AMINE® brand 2-(2-aminoethoxy) ethanol composition of this invention can be employed.

The scrubbing compositions of this invention are aqueous treating compositions containing MDEA and DIGLYCOL AMINE® brand 2-(2-aminoethoxy)ethanol. Generally, the total amount of amine in the aqueous composition is in the range from about 30% to about 70%, based on the total weight of amine in comparison to the total weight of the aqueous composition. More typically, the aqueous compositions contain from about 40% to about 60% total amine, with about 50% being a common percentage. It is common for the user of amine scrubbing liquids to acquire the amine of choice, and dilute the amines with water to a percentage of choice. The extent of dilution of the aqueous scrubbing solutions of this invention are not critical, varying depending on a variety of factors such as type of scrubbing unit, temperature, pressure, composition of sour gas and so on.

The aqueous scrubbing composition of this invention, also referred to herein as a treating solution, contains MDEA and DIGLYCOL AMINE® brand 2-(2-aminoethoxy)ethanol in a MDEA/DIGLYCOL AMINE® brand 2-(2- aminoethoxy)ethanol ratio (weight/weight) of at least 2:1. This ratio can be at least about 3:1, and in certain embodiments may be at least about 3.5:1. These ratios provide compositions that in practice do not require regeneration. In general, if the amine solution contains about 5% or more BHEEU, a solvent regeneration is required.

The scrubbing process of the present invention is also commonly referred to as gas separation, sweetening, de-souring, or absorption. By sweetening it is meant the removal or separation of acid components ($CO_2$ and/or $H_2S$) as by absorption into the scrubbing composition. The process of this invention may be practiced on a large scale using packed columns or columns packed with bubble plates, in which the sour gas is contacted with scrubbing composition, typically in countercurrent fashion. The temperatures and pressures at which the MDEA/DIGLYCOL AMINE® brand 2-(2-aminoethoxy)ethanol composition contacts the sour gas to be treated may vary. Temperatures are generally in the range of about 10° C. to about 100° C., with temperatures in the range of from about 60° C. to about 80° C. being common. Pressures are typically 0 psig to about 1500 psig. The flow rates at which the sour gas and scrubbing composition enter the scrubbing tower can vary widely depending on the make up of such streams, temperature, pressure, desired extent of acid gas removal and the like. Such flow rates are well known, and not critical to the practice of this invention.

Upon exiting the absorption column, the acid gas containing scrubbing composition is typically sent to a flash unit where reduced pressure is applied to thereby liberate the acid gas ($CO_2$ and/or $H_2S$) absorbed in the scrubbing composition. The resulting scrubbing composition may then be recycled to the absorption tower. If more fully regenerated scrubbing composition is desired, the resultant composition from the flash unit can be sent to a second flash unit or a steam stripping column. It should be noted that BHEEU does not, to any appreciable degree, convert to DIGLYCOL AMINE® brand 2-(2-aminoethoxy)ethanol in such flash units and stripping columns, and is believed to form in the flash unit and stripping column.

The reclamation units that are obviated by practice of this invention are exemplified by the reclaimer depicted in "Gas Purification," Arthur Kohl and Fred Riesenfield, Gulf Publishing Company (1985) at page 140. In this regard, DGA® brand 2-(2-aminoethoxy)ethanol solutions which contain an undesirable concentration of BHEEU are commonly reclaimed by means of simultaneous distillation and BHEEU hydrolysis. A slip stream of process solution, typically less than 3% of the process flowrate, is fed into a two-phase vessel. Normally hot, lean solution from the amine regenerator is used as reclaimer feed. The reclaimer is operated hotter than the reboiler. Usually this additional heat is supplied through indirect contact with steam or hot oil. Typically the operating temperature of the reclaimer is about 340 degrees Farenheit of higher. The operating pressure of the reclaimer is normally only slightly higher than the pressure of the amine regenerator. Sufficient temperature and residence time are provided for effective conversion of BHEEU back into DGA® brand 2-(2-aminoethoxy)ethanol. Typically water is supplied to the reclaimer in order to enhance conversion of BHEEU and recovery of DGA® brand 2-(2-aminoethoxy)ethanol. DGA® brand 2-(2-aminoethoxy)ethanol and excess water, obth being more volatile than BHEEU, concentrate in the vapor phase of the vessel, and return to the process in an overhead stream. Usually the heat contained in this returned stream is recovered in some useful manner. Low-volatility materials (such as salts, high molecular weight contaminants and particulates commonly found in gas treating applications) tend to accumulate in reclaimers. Over time the accumulation of these materials results in a vessel nearly filled with undesirable materials. At some point these accumulated materials must be removed from the reclaimer in order to maintain effective recovery of DGA® brand 2-(2-aminoethoxy) ethanol.

The sour gases to be treated in the practice of this invention are typically natural gas, synthesis gas or refinery gas which contain acid gases such as carbon dioxide and/or hydrogen sulfide. Such sour gas streams generally contain about 0.01% to about 10% acid gas.

The invention is an improvement over the prior art. It is known that when 2-(2-aminoethoxy)ethanol is exposed to acid gas impurities such as carbon dioxide, this chemical will be slowly converted to a urea, bis-(2-hydroxyethoxyethyl)urea (BHEEU). The resulting BHEEU is ineffective in removing the acid gas impurities from the subject gas such as natural gas. Thus, the 2-(2-aminoethoxy) ethanol must be replaced or regenerated (reclaimed) and added to periodically to retain purification efficiency. In order to achieve similar efficiency as 2-(2-aminoethoxy) ethanol in removing carbon dioxide from the subject gas, promoted MDEA solutions were then used. These solutions are still subjected to either degradation or operation difficulties. For instance, in the case of methylmonoethanolamine, this chemical is easily degraded and, in the case of piperizine, tight process parameters are needed due to its solid nature. In this invention, we show that keeping 2-(2-aminoethoxy)ethanol under a certain range of concentration, carbon dioxide can be removed effectively and without need for reclamation. In other words, a relatively stable solvent is obtained.

The reactants useful in the present invention are: MDEA; 2-(2-aminoethoxy)ethanol; and water. The conditions within which the present invention is useful are: temperature range of about 10° to about 100° C.; pressure range of about 0 to about 1500 psig.

In FIG. 1, there is shown a process of this invention. In FIG. 1, sour gas is introduced into absorption tower (10) via line (11) wherein the sour gas rises countercurrent to treating composition that is introduced in the upper portion of absorption tower (10) via line (12), line (13) or both. Acid gas ($CO_2$ and/or $H_2S$) are absorbed in tower (10) and exit via conduit (15). Original and make-up treating composition may be introduced via line (14).

Acid gas laden treating composition exits tower (10) via a second exit conduit (16), being sent under pressure to desorption unit (20), which may be a flash unit or a steam stripping column. If only one regeneration unit is employed, it is typical to use line (12) only.

In regeneration unit (20), desorption occurs whereby acid gases are liberated from the treating composition, with such liberated acid gases exiting via exit line (24). Regenerated treating composition exits via line (26), and flows through line (27) and valve (21) to line (12) via open valve (23) if a second regeneration unit is absent, or may flow to line (13) via open valve (22) if a second regeneration unit is employed.

When further desorption is desired, all or a portion of effluent from regeneration unit (20) is sent to second regeneration unit (30), which may be a flash unit or steam stripping column, via open valve (29) and line (28).

In second regeneration unit (30), addition desorption of all or a portion of first regeneration unit (20) is effected.

Liberated acid gas exits via line (31), with regenerated treating composition being recycled via line (32) through valve (33) to line (12).

It should be appreciated that a variety of regeneration steps and recycling steps may be employed as shown in FIG. 1. Thus, one or two regeneration units can be employed. All or a portion of effluent from a first regeneration unit may be sent to a second regeneration unit. Multiple injection points may thus be used to recycle treating composition to the absorption tower (10). It should also be appreciated that FIG. 1 depicts one arrangement of this invention, with the practice of this invention admitting to other lay-outs, configurations, multiple towers, specific pumps, valves and control features, with the proviso that a reclamation unit is excluded during the practice of this invention.

The invention is useful in removing acid gas impurities from a target gas. It is surprising and unexpected that a stable gas treating solution was observed and that no solvent regeneration (reclamation) is needed.

EXAMPLES

The following Examples are merely illustrative and should not be construed as limitations on the scope of the claims.

Example 1

The following experimental procedure was followed. A measured amount of amine solution of known composition was placed into a glass sparger bottle. The sparger bottle resided in a constant temperature bath. The bath was regulated at 40° C. The gas feed assembly consisted of a source gas on known concentration, a mass flow controller, a feed line placed into the sparger bottle, and a sparger stone placed at the end of the feed line. The sparger stone was positioned such that feed gas was introduced into the bottle beneath the liquid interface. The gas leaving the sparger bottle was analyzed for residual $CO_2$ content by gas chromatography. The sparger bottle operated at atmospheric pressure.

At time equal to zero, 60 liters per hour of a gas consisting of 2% v (20,000 ppmv) $CO_2$ and 98% v $N_2$ was introduced into the sparger assembly. Gas flow continued uninterrupted throughout the experiment. Thirty seconds after gas flow started, the first gas chromatograph sample was collected, and subsequent samples were collected every 212 seconds. Table 1 contains the results of the tests with Solution A (45% w MDEA, 55% w water) and with Solution B (10% w DGA® brand 2-(2-aminoethoxy)ethanol, 35% w MDEA, 55% w water). The effectiveness of DGA® brand 2-(2-aminoethoxy)ethanol as a promoter for $CO_2$ removal from gas streams is evident from the much smaller $CO_2$ in the off gas.

TABLE 1

Offgas Analysis in ppmv $CO_2$

| Sample # | Solution A 45% w MDEA | | Solution B 10% w DGA ®, 35% w MDEA | |
|---|---|---|---|---|
| | Run #1 | Run #2 | Run #3 | Run #4 |
| 1 | n/a | 8366 | 111 | 555 |
| 2 | 9910 | 7481 | 29 | 57 |
| 3 | 9342 | 6792 | 40 | 44 |
| 4 | 9681 | 5344 | 75 | 76 |
| 5 | 9373 | 6338 | 134 | 140 |
| 6 | 9296 | 7475 | 222 | 223 |

TABLE 1-continued

Offgas Analysis in ppmv $CO_2$

| Sample # | Solution A 45% w MDEA | | Solution B 10% w DGA ®, 35% w MDEA | |
|---|---|---|---|---|
| | Run #1 | Run #2 | Run #3 | Run #4 |
| 7 | 9856 | 8131 | 333 | 318 |
| 8 | 10381 | 9272 | 508 | 441 |
| 9 | 10242 | 10370 | 719 | 618 |
| 10 | 11411 | 10662 | 1004 | 855 |

Example 2

To an 840 ml rocking autoclave was charged 275 g of water, 50 g of 2-(2-aminoethoxy)ethanol, 175 g of MDEA, 60 g of carbon dioxide, and about 5 g of hydrogen disulfide. The autoclave was then heated to 120° C., and samples were collected every three weeks and analyzed for BHEEU content by liquid chromatography. The results are as follows.

| Sample # | Heating Time (day) | % BHEEU |
|---|---|---|
| 11 | 7 | 0.170 |
| 12 | 14 | 0.258 |
| 13 | 21 | 0.116 |

Example 2 shows BHEEU content under control with no regeneration needed.

Example 3

The procedure of Example 2 was followed except that 100 g of 2-(2-aminoethoxy)ethanol and 125 g of MDEA were used. The results are as follows:

| Sample # | Heating Time (day) | % BHEEU |
|---|---|---|
| 14 | 7 | 1.105 |
| 15 | 14 | 1.047 |
| 16 | 21 | 0.883 |

Example 3 shows that BHEEU content will increase significantly if 2-(2-aminoethoxy)ethanol content is increased to a great extent. Regeneration is needed with the scrubbing liquid of Example 3. Thus, whereas the amount of 2-(2-aminoethoxy)ethanol employed in Example 3 as compared to Example 2, the % BHEEU increased by a factor of 6.5, 4.1 and 7.6 when Sample 11 is compared to Sample 14, when Sample 12 is compared to Sample 15 and when Sample 13 is compared to Sample 16.

What is claimed is:

1. A process for the separation of carbon dioxide and hydrogen sulfide from a gas stream, said process comprising:

contacting a treating solution with the gas stream, said treating solution comprising from about 25% to about 50% by weight of MDEA and from about 3% to about 15% of 2-(2-aminoethoxy)ethanol; and wherein no reclamation step is needed.

2. The process of claim 1 wherein the treating solution and the gas stream are contacted at a temperature of about 10° to about 1000° C. and at a pressure range of about 0 to about 1500 psig.

3. The process of claim 1 wherein the treating solution further comprises water.

4. A gas separation process, comprising:

contacting an aqueous treating solution with a sour gas stream that contains carbon dioxide, hydrogen sulfide or both under conditions such that the gas stream is sweetened, wherein the aqueous treating solution contains methyldiethanol amine and 2-(2-aminoethoxy)-ethanol in a ratio of at least about 2:1; and wherein the process is conducted in the absence of a reclamation step.

5. The process of claim 4, wherein the total amount of amine in the aqueous treating solution is in the range from about 30% to about 70%.

6. The process of claim 4, wherein the ratio is at least about 3:1.

7. The process of claim 5, wherein the ratio is at least about 3.5:1.

8. The process of claim 4, wherein the contacting occurs at a temperature in the range from about 60° C. to about 80° C.

9. The process of claim 4, wherein the sour gas is natural gas.

10. The process of claim 4, wherein the sour gas tream contains about 0.01% to about 10% acid gas.

11. The process of claim 4, wherein the total amount of amine in the aqueous treating solution is in the range from about 30% to about 70%, wherein the ratio is at least about 3:1, wherein the contacting occurs at a temperature in the range from about 60° C. to about 80° C.

12. The process of claim 11, wherein the sour gas is natural gas, wherein the sour gas tream contains about 0.01% to about 10% acid gas.

13. A gas purification process, consisting of:

(A) contacting a sour gas stream with an aqueous treating composition under conditions such that the sour gas is sweetened by absorption of acid gas in the sour gas into the aqueous treating composition, wherein the aqueous treating composition contains methyldiethanolamine and 2-(2-aminoethoxy)ethanol in a ratio of at least about 2:1, such that no reclamation is needed;

(B) deabsorbing the acid gas from the aqueous treating composition by flashing, steam stripping or both to thereby form a regenerated aqueous treating solution; and (C) recycling the regenerated aqueous treating composition to step (A).

14. The process of claim 13, wherein the total amount of amine in the aqueous treating composition is in the range from about 30% to about 70%.

15. The process of claim 13, wherein the ratio is at least about 3:1.

16. The process of claim 14, wherein the ratio is at least about 3.5:1.

17. The process of claim 13, wherein the contacting occurs at a temperature in the range from about 60° C. to about 80° C.

18. The process of claim 13, wherein the sour gas is natural gas.

19. The process of claim 13, wherein the sour gas tream contains about 0.01% to about 10% acid gas.

20. The process of claim 13, wherein the total amount of amine in the aqueous treating solution is in the range from about 30% to about 70%, wherein the ratio is at least about 3:1, wherein the contacting occurs at a temperature in the range from about 60° C. to about 80° C.

21. The process of claim 20, wherein the sour gas is natural gas, wherein the sour gas tream contains about 0.01% to about 10% acid gas.

* * * * *